US008384233B2

(12) United States Patent
Lagerweij et al.

(10) Patent No.: US 8,384,233 B2
(45) Date of Patent: Feb. 26, 2013

(54) GENERATOR FOR DIRECT DRIVE WIND TURBINE

(75) Inventors: Hendrik Lambertus Lagerweij, Kootwijkerbroek (NL); Andre Heinz Pubanz, Amersfoort (NL); Aart Van Der Pol, Otterlo (NL); Albert Waaijenberg, Barneveld (NL)

(73) Assignee: Lagerwey Wind B.V., Barneveld (NL)

( * ) Notice: Subject to any disclaimer, the term of this patent is extended or adjusted under 35 U.S.C. 154(b) by 418 days.

(21) Appl. No.: 12/835,827

(22) Filed: Jul. 14, 2010

(65) Prior Publication Data

US 2011/0001320 A1  Jan. 6, 2011

Related U.S. Application Data

(63) Continuation-in-part of application No. PCT/NL2009/050011, filed on Jan. 15, 2009.

(30) Foreign Application Priority Data

Jan. 16, 2008 (NL) ..................................... 2001190

(51) Int. Cl.
*F03D 9/00* (2006.01)
*H02P 9/04* (2006.01)

(52) U.S. Cl. .......................................... 290/55; 290/44
(58) Field of Classification Search .............. 290/44, 290/55
See application file for complete search history.

(56) References Cited

U.S. PATENT DOCUMENTS

| 6,774,504 | B1* | 8/2004 | Lagerwey ........................ 290/44 |
| 6,794,781 | B2* | 9/2004 | Razzell et al. .................. 310/114 |
| 6,975,045 | B2* | 12/2005 | Kurachi et al. ................. 290/44 |
| 7,033,139 | B2 | 4/2006 | Wobben ........................ 415/178 |
| 7,179,056 | B2 | 2/2007 | Siegfriedsen .............. 416/170 R |
| 7,471,009 | B2* | 12/2008 | Davis et al. ...................... 290/54 |
| 7,528,497 | B2* | 5/2009 | Bertolotti ........................ 290/55 |
| 7,687,932 | B2* | 3/2010 | Casazza et al. ................. 290/55 |
| 7,893,555 | B2* | 2/2011 | Casazza et al. ................. 290/55 |
| 7,952,346 | B2* | 5/2011 | Helle et al. ............... 324/207.25 |
| 7,982,352 | B2* | 7/2011 | Nymann et al. .......... 310/156.32 |
| 8,022,567 | B2* | 9/2011 | Davis et al. ...................... 290/54 |
| 8,120,198 | B2* | 2/2012 | Pabst et al. ...................... 290/55 |

(Continued)

FOREIGN PATENT DOCUMENTS

| DE | 18 08 577 A1 | 8/1969 |
| EP | 1 641 102 A1 | 3/2006 |

(Continued)

OTHER PUBLICATIONS

International Search Report, dated Dec. 10, 2009, from corresponding PCT application.

*Primary Examiner* — Pedro J Cuevas
(74) *Attorney, Agent, or Firm* — Young & Thompson

(57) ABSTRACT

Direct driven wind turbine includes a tower, a nacelle, a rotor blade, a radial flux generator with a stator and a rotor, wherein the lamination package of the generator is essential for the transfer of the torque in axial direction. By introducing this additional function to the lamination package, the generator can be provided without additional torque transferring housing. Preferably, the lamination package obtains this additional function by pressing together the laminations between the front plate and end plate by tensile bolts. This gives sufficient strength to transport the torque in axial direction through the laminations to the mounting points of the generator. Preferably, the laminations include cooling fins. Due to these measures the cooling of the generator improves and active cooling may become superfluous or the power can be increased. The housing of the laminations is an expensive, heavy and labor intensive part which is no longer required due to the invention.

12 Claims, 3 Drawing Sheets

U.S. PATENT DOCUMENTS

Figure 1:
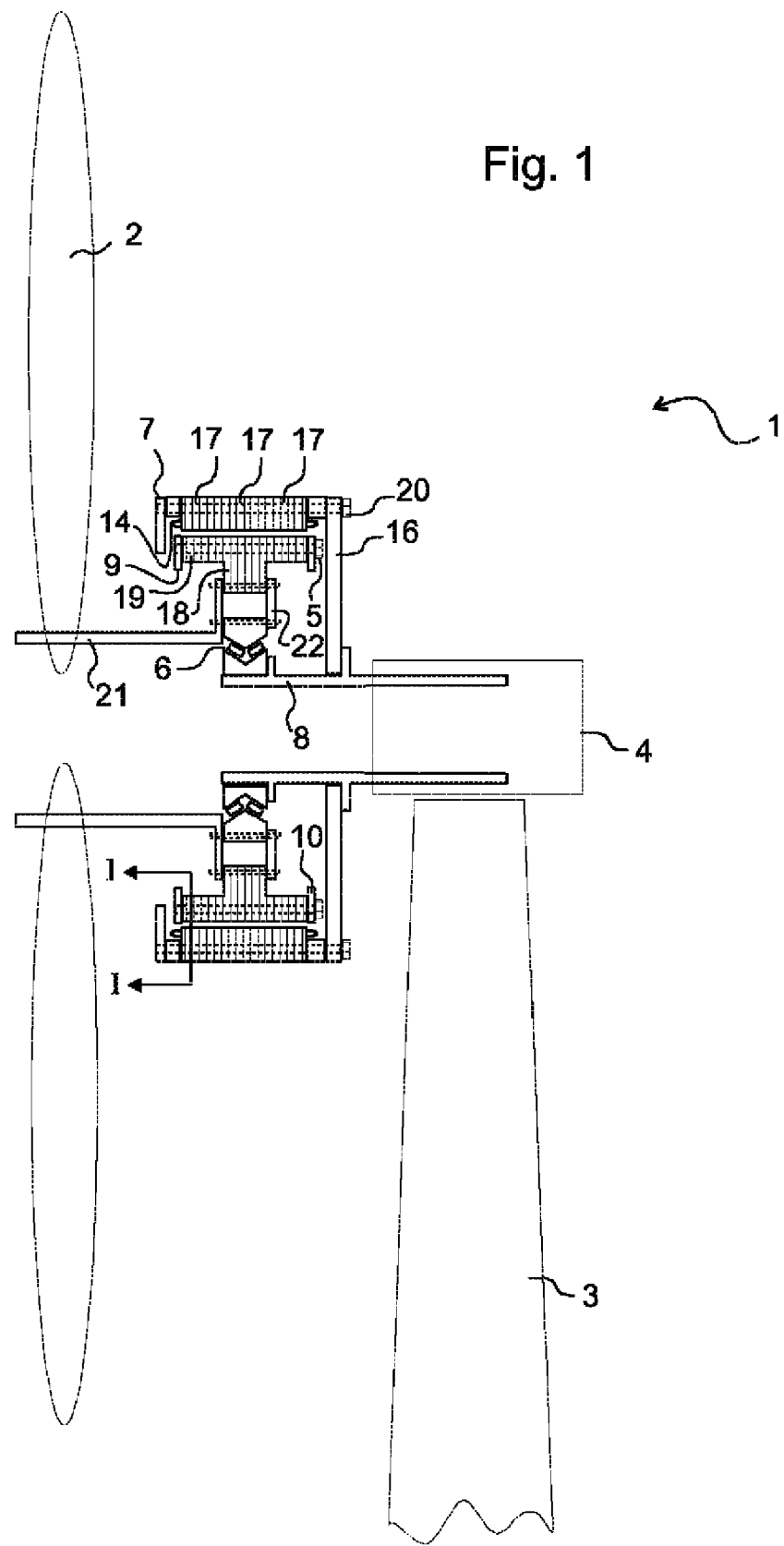

| | | | |
|---|---|---|---|
| 8,198,749 B2 * | 6/2012 | Numajiri | 290/55 |
| 2004/0041409 A1 * | 3/2004 | Gabrys | 290/55 |
| 2004/0108781 A1 * | 6/2004 | Razzell et al. | 310/112 |
| 2005/0194790 A1 * | 9/2005 | Kurachi et al. | 290/44 |
| 2005/0285407 A1 * | 12/2005 | Davis et al. | 290/54 |
| 2006/0284511 A1 | 12/2006 | Evon et al. | 310/216.004 |
| 2007/0108865 A1 | 5/2007 | Jansen et al. | 310/266 |
| 2008/0012346 A1 * | 1/2008 | Bertolotti | 290/55 |
| 2008/0203848 A1 | 8/2008 | Nymann et al. | 310/268 |
| 2009/0243300 A1 * | 10/2009 | Davis et al. | 290/54 |
| 2010/0007148 A1 * | 1/2010 | Davis et al. | 290/54 |
| 2010/0011567 A1 * | 1/2010 | Helle et al. | 29/598 |
| 2010/0033166 A1 * | 2/2010 | Helle et al. | 324/205 |
| 2010/0090553 A1 * | 4/2010 | Ritchey | 310/114 |
| 2011/0204738 A1 * | 8/2011 | Helle et al. | 310/156.01 |

FOREIGN PATENT DOCUMENTS

| | | |
|---|---|---|
| GB | 2 436 720 A | 10/2007 |
| JP | 58-192453 A | 11/1983 |
| WO | 00/74214 A1 | 12/2000 |
| WO | 02/095222 A1 | 11/2002 |
| WO | 2004/027260 A1 | 4/2004 |

\* cited by examiner

GENERATOR FOR DIRECT DRIVE WIND TURBINE

This is a continuation-in-part (CIP) of International PCT Application PCT/NL2009/050011, filed on Jan. 15, 2009, which claims priority to Dutch Application No. 2001190 filed on Jan. 16, 2008. The entire contents of each of the above-identified applications are hereby incorporated by reference.

The invention concerns the radial flux generator of a direct driven wind turbine, which turbine can convert wind energy into electric energy which can be fed into the grid. The installation comprises inter alia a rotor blade which is fixed to a shaft, a rotor of a generator fixed to said shaft, a nacelle which holds the static part of the generator and a support structure.

BACKGROUND INFORMATION

The direct drive wind turbine concept is commonly known. Several embodiments of this concept can be found in the design study NREL/SR-500-35524. All those direct drive embodiments use a generator with a stator in a stator house which is fixed to the nacelle. In this patent text the term "housing" can refer to the stator house or to the rotor house or to both. The stator comprises inter alia windings and laminations. The rotor of the generator may comprise windings or permanent magnets, both options can be combined with a lamination package. The lamination package of the rotor is fixed to a rotor house which is fixed to the rotor blades via several connection means. For several known types of generators we refer to 'Permanent Magnet Synchronous Motor for Industrial Inverter Applications', PhD thesis, Tanja Heikkilä, Lappeenranta Univ. of Techn.

DISADVANTAGES

The above generator concepts utilize a housing for the laminations, which housing serves inter alia to take up the torque. The property of a direct driven wind turbine is that the generator torque is much higher than that of a wind turbine with a gear box. The torque is exerted to the laminations and needs to be transferred in axial direction to the mounting points of the generator. The laminations are thin plates put on top of each other and which can shift over each other so that they cannot transfer much torque in axial direction. Therefore the laminations are fixed in the housing and transfer the forces to the cylindrical housing which can transfer the torque well. This means however that the laminations have to be mounted well to the housing and that the housing needs to be sufficiently strong to take up the high torque. Due to these constraints the housing is a heavy and expensive member.

The heat transfer from laminations to the outside through the housing is better when the housing is in good thermal contact with the laminations, which adds further constraints to the manufacturing of both the housing and the laminations. Even in the case of a good contact of the housing, it still is a thermal barrier for the heat exchange to the ambient air. The worse the heat exchange, the lesser the currents through the windings have to be to avoid overheating.

The housing furthermore has the important protective function against corrosion of the laminations. The laminations are very corrosive in particular in the ambient air and certainly near the sea a good protection is required. Conclusively, the generator housing is for the actual wind turbines a must, however at the same time it is a large heavy and expensive part.

EP 1641102 A1 discloses an electrical machine having a lamination stack. This lamination stack is held together by bolts extending through the stack. The heads of the bolts are insulated from the stack by an insulating ring.

WO 02/095222 discloses a wind turbine generator having a stator comprising laminations and a housing which are integrated into each other around which a shell is provided.

AIM OF THE INVENTION

The aim of the invention is to overcome the mentioned disadvantages. In one embodiment of the invention this aim is realized by improving the coherence of the laminations so that the structural function of the housing is taken over by the lamination package. In a special embodiment of the invention the laminations and other elements transfer the torque to the mounting points of the generator or to the front or end plate.

On the laminations of the stator of a conventional radial flux generator a tangential force is exerted, which is transferred to the housing. The tangential forces of all stator laminations add up to the torque on the housing which is transferred by the housing in axial direction to the mounting points. However for a generator according to one embodiment of the invention the housing is not present. In that case the laminations are essential for the transfer of the torque in axial direction. Essential means that when the laminations are taken out, the remaining structure will deform plastically when the generator torque would be maximal.

According to the invention about 100% of said torque is transferred axially through the laminations to the mounting points of the generator. In a special embodiment of the invention the laminations are welded together. Also axial or helical rods may be welded on the laminations. It should be understood that "axial transfer of torque through the laminations" should be interpreted also as transfer through elements which are welded to the laminations or transfer by the welds, so that such embodiments are part of the invention.

According to a further aspect of the invention through tensioning bolts or other tensioning members laminations are pressed to each other. This force has such a magnitude that said torque is transferred axially through friction from one lamination to the other, i.e. the bolt or other friction element is substantially not subjected to a shearing force acting thereon and caused by relative rotation of adjacent laminations relative to each other.

According to the expert in the art the housing around the laminations is essential for structural reasons and to avoid corrosion of the laminate. Therefore the expert directly rejects the omission of the housing as option for improvement. Experiments have revealed however, that the corrosion of the laminate can be avoided with certain coatings and that the structural functions of the housing can be taken over by the laminations.

According to a preferred embodiment of the invention the laminations are directly exposed to the ambient air, wherein the word directly means that no separate metal cover is protecting the laminations. When the laminations are protected by a coating this is interpreted as directly exposed.

The stator of the radial flux generator can be both outside and inside of the associated rotor. In those two cases both stator and the rotor may comprise laminations which are not supported by a housing. All those configurations are preferred embodiments according to the invention when at least the stator or the rotor comprises laminations which are not supported by a housing and wherein the laminations are essential for the transfer of the torque in axial direction.

Further advantage is obtained by application of permanent magnets. In a preferred embodiment of the invention the permanent magnets are fixed inside or upon the laminations, wherein the laminations contribute essentially to the transfer of the torque in axial direction. More in particular in this embodiment permanent magnets are applied in the rotor.

A preferred embodiment of the invention is that wherein the heat dissipated by the generator is removed passively, so that an active cooling system is not required. In particular for offshore wind turbines this is relevant, wherein the omission of an active cooling system is beneficial since it increases availability.

A preferred embodiment of the invention is that wherein the outer contour or the inner contour of a cross-section of the laminate normal to the axial direction is enlarged by a factor which is more than 1.5 and in particular more than 3 and preferably more than 5 compared to the smallest circular contour in said cross section fully enclosing said laminations. This embodiment has the advantage of a better cooling of the laminations due to the enlarged surface, so that the torque of the generator can be increased without overheating.

Further advantage is obtained when the laminations are pressed together in axial direction with a force which is larger by a factor of 1 and in particular by a factor of 2 and preferably by a factor of 6 than the ratio of the maximum operational torque $T_{max}$ and the radius of the air gap $r_{air\ gap}$.

According to the invention the outside of the lamination package is covered by an anti corrosive layer. Such a layer can be any known layer to avoid corrosion such as e.g. sprayed paint, power coating, galvanization, wounding a tape of metal strip around the laminations, the melting of a layer of vacuum suction of a bag enclosing the laminations and then fixing. The layer can also be a tar layer, or of tectyl or epoxy or can be applied during the manufacturing of the generator in a vacuum tank. The anti corrosive layer is preferably not thicker than 5 mm, in particular not thicker than 3 mm and more in particular not thicker than 1 mm and preferably less than 0.3 mm.

According to the invention the housing is no longer used for the stator laminations which can consequently be directly subjected to environmental air. This means that direct cooling of the lamination is possible such that mechanical or forced cooling is no longer necessary adding to the simplicity of the present invention.

According to a further aspect of the invention the bolt or other tensioning member engaging the laminations is in magnetic contact with such laminations. There is no isolation between the bolt or other tensioning member and the related "first" and "last" lamination. This means relatively high forces can be absorbed acting on such laminations and ensuring that the torque is transmitted through friction between the laminations. If isolations were to be used such isolation would limit the tensile force which can be provided on a tensioning member or bolt.

Further advantage is obtained when the invention is applied to a horizontal axis wind turbine with a rotor diameter larger than 30 m and in particular larger than 80 m and more in particular larger than 120 m. Research has revealed that the cooling requirements of direct drive turbines increase with increasing turbine diameter. The power of the turbine increases by square of the diameter while the rotation speed decreases inversely proportional to the diameter. Conclusively the rotor torque increases by about the cube of the rotor diameter. As a first order approximation the heat dissipated by a generator is proportional to the square of the torque and the heat dissipation increases faster than the power. In conclusion application of the invention becomes increasingly important with increasing diameter. Several state of the art turbines of over 50 m diameter require active cooling. For the same reasoning further advantage is also obtained when the invention is applied to turbines with a nominal power of more than 250 kW and in particular more than 2 MW and more in particular more than 5 MW.

Connection to the grid is preferably via a power electronic converter.

According to an example of the invention the cooling of the generator is improved by fixing separate cooling fins to the laminations. Such fins van be fixed by any known fixation method such as welding, click-joints, a swallow tail, adhesion etc. In a preferred embodiment the cooling fins are manufactured by extrusion of a alloy containing aluminum.

Further advantage can be obtained when tensile elements are placed through inserts in the laminations and in particular when said tensile elements connect the end plate and front plate of the generator through holes in the laminations and more in particular when those tensile elements comprise tensile bolts which yield a fitting structure with the laminations. The advantage of such a fitting structure is that during the production of the generator the laminations can be stapled on the fitting tensile bolts so that the correct generator geometry is built up. During the manufacturing of the generator the bolts can be positioned by fixing them to the front or end plate.

Further advantage can be obtained when cooling ducts are passed through inserts in the laminations, so that heat can be removed.

FIGURES

The figures below show preferred embodiments according to the invention.

Figure 2:
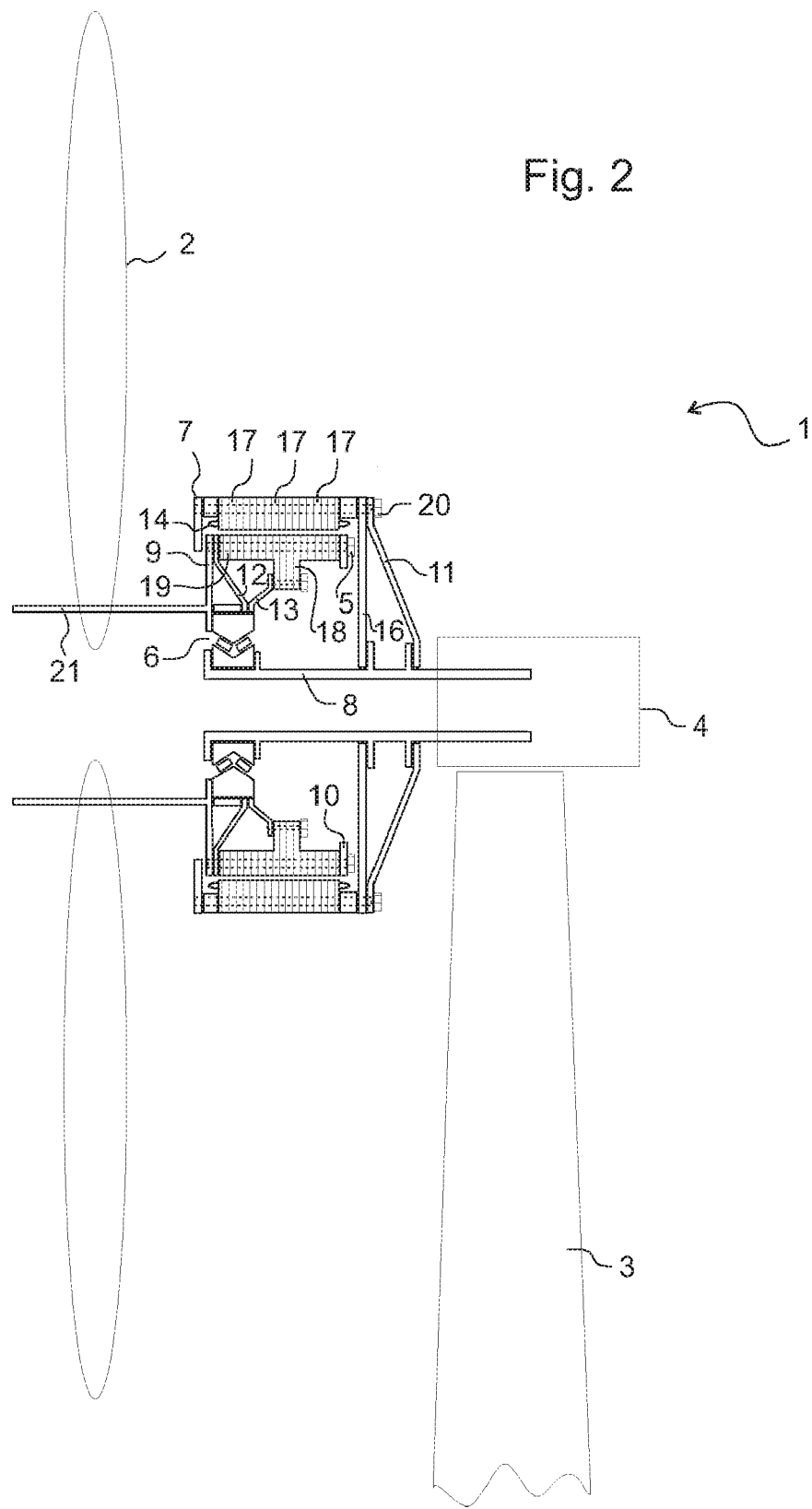
Figure 3:
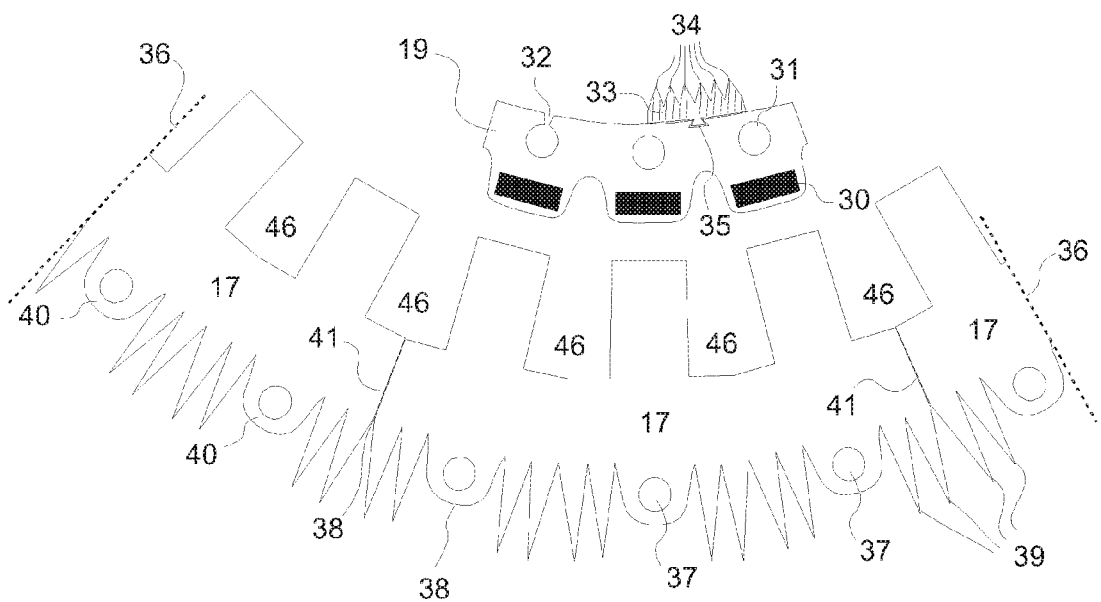
Figure 4:
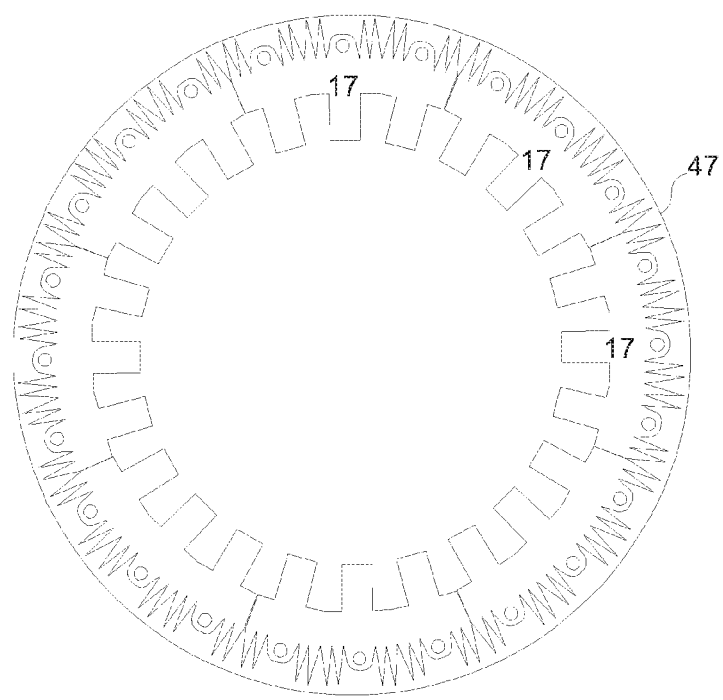

FIG. 1 Wind turbine according to the invention.
FIG. 2 Wind turbine according to the invention.
FIG. 3 Cross section I-I in FIG. 1.
FIG. 4 Cross section stator laminate.

FIGS. 1 and 2 show a wind turbine 1 with rotor blades 2, a tower 3 and a nacelle 4. The stator of the generator comprises a front plate 7, an end plate 16 and windings 14 around laminations 17. The laminations provide in the outer periphery of the wind turbine 1, i.e. no further cover or other item is provided around the outer periphery of such laminations. This means that the outer circumference of the laminations 17 is in direct contact with outside air for cooling purposes. Because of that this outside surface might be provided with an anti corrosion coating. The laminations 17 are bolted together by bolts 20. According to the invention a cylindrical steel housing around the laminations is not present. Also a housing for the rotor is not present. The rotor of the generator has a front plate 9 and an end plate 10 and in between laminations 19 which are connected by bolts 5. The laminations 18 are higher than laminations 19 to improve the structure and/or to serve as a support arm towards bearing 6. For certain embodiments of the invention laminations 18 can be replaced by a plate, e.g. of massive steel.

In FIG. 1 the connection between laminations 19 and the bearing 6 is realized by element 22 and hollow shaft 21. In FIG. 2 the end plate 16 of the stator is strengthened by element 11. The rotor is strengthened by element 12 which connects the end plate 9 to bearing 6. FIG. 2 shows as well a strengthening element 13 between bearing 6 and laminations 19.

As example only bolts 20 can comprise M30 bolts i.e. bolts having a diameter of 30 mm. These are preferably high tensile bolts and could provide a pretension of 20-30 ton for each bolt. For a 2 meter diameter stator for example 60 of such bolts could be used and torque is substantially solely transferred through friction between adjacent pretensioned laminations.

FIG. 3 shows the cross section I-I of FIG. 1. The rotor comprises permanent magnets 30 and laminations 19. The laminations of rotor or stator have respectively holes 31 and 37 or holes 32 with an open connection to hold the bolts 5 or 20. The laminations 17 are supplied with cooling fins 39 and can be punched as a whole from a plate. The laminations 19 are supplied with separate cooling elements 33 with cooling fins 34. The separate cooling elements 33 may consist of extruded aluminium and can be attached with a swallow tail 35. Of course another embodiment of the invention is that wherein the separate cooling elements are applied to the stator laminate 17 and/or wherein the rotor laminations and the cooling fins are one piece. FIG. 3 shows 3 laminations 17 of which one is completely visible and two are cut off in the drawing by lines 36. The pieces fit together at dilatations 41. The dilatations between two segments may coincide with a bolt location. For every next layer of laminations the locations 41 may be shifted one or more bolt position further so that the locations 41 do not coincide for different layers. When all laminations are placed they can be welded at locations 38 to further strengthen the structure. The windings in slots 46 are not shown in the figure. The bolts 20 fit in holes 37 in nocks 40 and pull together front and end plate with in between the laminations 17 so that the front and end plate together with the laminate forms one strong construction.

FIG. 4 shows the stator laminations of a cross section of the generator. Contour 47 is the smallest circle fully enclosing the laminations 17. This contour is the reference for both the inner and the outer contour to determine whether the laminations are an embodiment according to the invention. When determining the length of the outer or inner contour the dilatations 41 should be excluded.

The number of laminations drawn in FIGS. 1 and 2 is less than in practice to make the illustrations more clear. In practice the thickness of the laminations is in the order of 1 to several mm. The generators in FIGS. 1 and 2 are drawn relatively big compared to e.g. the rotor blades.

The expert will also understand that a turbine in this text refers to both vertical axis and horizontal axis turbines which are only type denotations which do not prescribe the precise orientation of the axis. Furthermore the claims refer to all known types of wind turbine generators such as without limitation generators with copper windings in the stator, double sided generators with both a rotor outside and inside of the stator, or both a stator inside and outside of the rotor, generators utilizing super conduction or high temperature super conduction. For a superconducting generator it is an advantage that the generator mass and thus the heat capacity is less, when the laminations take over the structural function of the housing and the housing is omitted.

For the expert in the art it is trivial that the laminate can be produced by helically coiling the laminate on top of each other. Thereby the bolts can serve as a fit. This patent application comprises physical explanations for the different phenomena. It should be understood that the validity of those explanations is not related to the validity of the enclosed claims. The references made in this application are incorporated herein by reference in their entirety. While the description and drawings herein described constitute preferred embodiments of the invention, it is to be understood that the invention is not limited to these precise denotations and that changes herein which are enclosed in the appended claims are under the scope of the invention.

The invention claimed is:

1. Direct driven wind turbine comprising a blade, a tower, a main shaft and a radial flux generator which is connected to the grid and comprises laminations, wherein said laminations are essential for the transfer of the torque in axial direction, wherein said laminations transfer the torque in axial direction for almost 100%, wherein the outside of the laminations is covered by an anti corrosive layer.

2. Direct driven wind turbine according to claim 1, wherein said laminations are directly exposed to the ambient air.

3. Wind turbine according to claim 1 wherein the stator is located outside of the rotor.

4. Wind turbine according to claim 1 wherein the rotor comprises permanent magnets.

5. Wind turbine according to claim 1 wherein said turbine comprises an offshore turbine and in particular that the cooling of the generator is essentially passive.

6. Wind turbine according to claim 3 wherein the laminations are supplied with cooling fins which increase the cooling surface by at least a factor 1.5, in particular by at least a factor 3 and more in particular by at least a factor 5.

7. Wind turbine according to claim 1 wherein a tensile joint presses together the laminations in axial direction by a force which is larger than 1 time and in particular larger than 2 times and more in particular larger than 6 times the ratio between the maximum operational torque $T_{max}$ and the radius of the air gap $r_{airgap}$.

8. Wind turbine according to claim 1 wherein the distance between the laminations and the ambient air is less than 5 mm, in particular less than 3 mm and more in particular is less than 1 mm.

9. Wind turbine according to claim 1 of the horizontal axis type wherein the rotor diameter is larger than 30 meter and in particular is larger than 80 meter and more in particular is larger than 120 meter.

10. Wind turbine according to claim 6 wherein separate cooling fins are connected to the laminations and in particular wherein those fins are manufactured by extrusion of an alloy containing aluminum.

11. Wind turbine according to claim 1 wherein the generator comprises tensile rods through the laminations and in particular that said tensile rods connect a front plate and an end plate with in between laminations and more in particular that said tensile rods fit with the holes in the laminations.

12. Wind turbine according to claim 1 wherein the laminations comprise internal cooling ducts.

* * * * *